US008967584B2

(12) United States Patent
Enokijima

(10) Patent No.: US 8,967,584 B2
(45) Date of Patent: Mar. 3, 2015

(54) POWER SLIDE DEVICE FOR VEHICLE SEAT

(71) Applicant: Shiroki Corporation, Kanagawa (JP)

(72) Inventor: Tomohiro Enokijima, Kanagawa (JP)

(73) Assignee: Shiroki Corporation, Fujisawa-shi, Kanagawa (JP)

( * ) Notice: Subject to any disclaimer, the term of this patent is extended or adjusted under 35 U.S.C. 154(b) by 75 days.

(21) Appl. No.: 13/869,365

(22) Filed: Apr. 24, 2013

(65) Prior Publication Data

US 2013/0284875 A1    Oct. 31, 2013

(30) Foreign Application Priority Data

Apr. 25, 2012   (JP) ................................. 2012-099591

(51) Int. Cl.
| | | |
|---|---|---|
| *F16M 13/00* | (2006.01) | |
| *B60N 2/07* | (2006.01) | |
| *B60N 2/42* | (2006.01) | |
| *B60N 2/06* | (2006.01) | |

(52) U.S. Cl.
CPC ............ *B60N 2/0722* (2013.01); *B60N 2/4249* (2013.01); *B60N 2/0727* (2013.01); *B60N 2/067* (2013.01); *B60N 2/0715* (2013.01)
USPC ....................................................... 248/429

(58) Field of Classification Search
USPC ............... 248/429, 430; 297/344.1; 74/89.14, 74/89.32, 425
See application file for complete search history.

(56) References Cited

U.S. PATENT DOCUMENTS 5,150,872 A    9/1992   Isomura

FOREIGN PATENT DOCUMENTS

| DE | 102004001593 B3 | 8/2005 |
|---|---|---|
| JP | 2004 210174 | 7/2004 |
| WO | 2011150489 A1 | 12/2011 |

OTHER PUBLICATIONS

T S TEC KK, "Power slide seat for automobile with position sensor," Patent Abstracts of Japan, Publication Date: Jul. 29, 2004; English Abstract of JP-2004 210174.
European Search Report for EP13165266 dated Aug. 5, 2014.
English Abstract of DE-102004001593, Publication Date: Aug. 11, 2005.

*Primary Examiner* — Amy Sterling
(74) *Attorney, Agent, or Firm* — Millen, White, Zelano, Branigan, P.C.

(57) ABSTRACT

A power slide device for a vehicle seat includes a lower rail and an upper rail slidable relative to the lower rail, a front support member fixed to the lower rail, a screw rod, a rear support member provided with a rear orthogonal plate portion and a fixed plate portion, a movement limiter which limits movement of the screw rod, a worm wheel, and a collision load receiving portion which limits forward tilting of the rear orthogonal plate portion by contacting the base surface of the lower rail when a force is exerted on the screw rod forwardly from the worm wheel. The collision load receiving portion is positioned in front of the rear orthogonal plate portion and is spaced downward from the screw rod and integrated with the rear support member that is mounted to the screw rod.

5 Claims, 6 Drawing Sheets

POWER SLIDE DEVICE FOR VEHICLE SEAT

BACKGROUND OF THE INVENTION

1. Field of the Invention

The present invention relates to a power slide device for a vehicle seat.

2. Description of Related Art

FIG. 9 shows an example of a power slide device, according to the related art, for a vehicle seat.

This power slide device is provided with a lower rail 01, an upper rail 02, a screw rod 03 and a gear box 04. The lower rail 01 is fixed to a vehicle floor and extends in the forward/rearward direction (horizontal direction with respect to FIG. 9), the upper rail 02 is slidable relative to the lower rail 01 in the forward/rearward direction, the screw rod 03 is fixed to the lower rail 01 and extends in the forward/rearward direction, and the gear box 04 is fixed to the upper rail 02. The gear box 04 is equipped with a worm wheel (not shown) which rotates by the driving force of a motor (not shown). The screw rod 03 is screw-engaged into a female screw hole, which formed in the worm wheel as a through-hole extending in the forward/rearward direction.

A front support member (not shown) is fixed to the front of the lower rail 01 and supports the front of the screw rod 03. On the other hand, a rear support member 05 which is L-shaped in cross section is fixed to the rear of the lower rail 01. The rear support member 05 is provided with a substantially horizontal fixed portion 06 that is fixed to the lower rail 01 and a rear orthogonal (upright) plate portion 07 which extends upward from the front end of the fixed portion 06, and a through-hole 08 through which the screw rod 03 extends is formed in the rear orthogonal plate portion 07. Screwing two nuts 09 and 010 that are positioned behind and in front of the rear orthogonal plate portion 07 onto the screw rod 03 so as to sandwich and hold the rear orthogonal plate portion 07 between the front surface of the nut 09 and the rear surface of the nut 010 from the front and rear sides, respectively, makes the rear support member 05 fixedly support a portion of the screw rod 03 in the vicinity of the rear end thereof.

Accordingly, rotating the worm wheel in the forward direction by a forward rotation of the aforementioned motor causes the worm wheel and the upper rail 02 to move forward relative to the lower rail 01 and the screw rod 03, while rotating the worm wheel in the reverse direction by a reverse rotation of the aforementioned motor causes the worm wheel and the upper rail 02 to move rearward relative to the lower rail 01 and the screw rod 03.

If a vehicle equipped with this power slide device comes into collision with another vehicle ahead from behind, a forward inertia force acts on the upper rail 02 (and also on the seat fixed to the upper rail 02), and accordingly, a forward force acts on the screw rod 03 from the worm wheel.

Consequently, the screw rod 03 attempts to move forward relative to the rear support member 05. However, if this inertia force is smaller than a predetermined value, the screw rod 03 is prevented from moving forward by the rear support member 05 (the rear orthogonal plate member 07), so that the screw rod 03 and the rear support member 05 are maintained in the same state (shape) as before the collision.

Another example of the related art is disclosed in Japanese Unexamined Patent Publication No. 2004-210174.

However, when the aforementioned inertia force, which is caused by a collision of vehicle equipped with the power slide device occurring, is great (i.e., greater than the aforementioned predetermined value), the connecting portion between the fixed portion 06 and the rear orthogonal plate portion 07 is plastically deformed, which causes the rear orthogonal plate portion 07 to tilt forward about the connecting portion, thus causing the screw rod 03 that is supported by the rear orthogonal plate portion 07 to be deformed.

If the rear support member 05 is plastically deformed and the screw rod 03 is also deformed (plastically deformed) in the above-described manner, the power slide device no longer be actuated thereafter.

SUMMARY OF THE INVENTION

The present invention provides a vehicle-seat power slide device which makes it possible to prevent the screw rod, which is supported by the lower rail, from being deformed in a more effective manner when inertia force that is caused by a collision of the vehicle acts on the upper rail.

According an aspect of the present invention, a power slide device for a vehicle seat is provided, including a lower rail which is immovable with respect to a vehicle floor and extends in a forward/rearward direction; an upper rail which supports a seat, the upper rail being slidable relative to the lower rail in a lengthwise direction of the lower rail; a front support member fixed to the lower rail; a screw rod which extends in the forward/rearward direction, wherein a front portion of the screw rod is supported by the front support member; a rear support member provided with a rear orthogonal plate portion and a fixed plate portion, wherein the rear orthogonal plate portion lies in a plane orthogonal to a straight line extending in the lengthwise direction of the lower rail, wherein a rear through hole, into which a rear portion of the screw rod is inserted, is formed in the rear orthogonal plate portion, and wherein the fixed plate portion extends rearward from a lower end of the rear orthogonal plate portion and is fixed to a base surface of the lower rail; a movement limiter which limits movement of the screw rod relative to the rear support member; a worm wheel provided with a female screw hole, in which the screw rod is screw-engaged so as to extend and pass through the worm wheel, wherein the worm wheel moves with the upper rail in the forward/rearward direction relative to the lower rail by rotating by power of a driver; and a collision load receiving portion which limits forward tilting of the rear orthogonal plate portion by contacting the base surface of the lower rail when a force is exerted on the screw rod forwardly from the worm wheel, wherein the collision load receiving portion is positioned in front of the rear orthogonal plate portion in the forward/rearward direction and is spaced downward from the screw rod and integrated with the rear support member that is mounted to the screw rod.

Accordingly, if a large forward inertia force which is caused by a collision of a vehicle equipped with the power slide device acts on the upper rail, the rear orthogonal plate portion of the rear support member attempts to tilt forward by a large amount, relative to the fixed plate portion (the connecting portion between the fixed plate portion and the rear orthogonal plate portion attempts to be plastically deformed).

However, according to the above-described configuration, upon the rear orthogonal plate portion slightly tilting forward (upon the connecting portion between the fixed plate portion and the rear orthogonal plate portion being slightly deformed), the aforementioned inertia force acting on the upper rail is received by the rear support member and the collision load receiving portion.

Accordingly, except when the inertia force acting on the upper rail is extremely large, there is no possibility of the screw rod being deformed (plastically deformed) by an occurrence of plastic deformation of the rear support member. Consequently, the power slide device can be smoothly actuated even after a collision.

It is desirable for power slide device to include a front contact member which includes a front orthogonal plate portion which lies in a plane orthogonal to the straight line and the collision load receiving portion, wherein the front orthogonal plate portion is positioned in front of the rear orthogonal plate portion and is provided with a front through-hole, via which the screw rod extends through the front orthogonal plate portion. The movement limiter includes a rear nut, a front surface of which is in contact with a rear surface of the rear orthogonal plate portion, the rear nut being screw-engaged with the screw rod at a position behind the rear orthogonal plate portion; and a front nut which is screw-engaged with the screw rod at a position in front of the rear orthogonal plate portion, the front nut holding the front contact member in a state where the front contact member is in contact with a front surface of the rear orthogonal plate portion.

Accordingly, upon the rear orthogonal plate portion slightly tilting forward (upon the connecting portion between the fixed plate portion and the rear orthogonal plate portion being slightly deformed), the inertia force acting on the upper rail is received by two members: the rear support member and the front contact member. Accordingly, the rear support member can be more securely prevented from tilting by a large amount to a degree such as to become plastically deformed.

It is desirable for the front contact member to include the front nut, wherein the front nut is coaxial with the front through-hole, and the front nut is integrally formed with a front surface of the front orthogonal plate portion even in a separate state from the screw rod.

Accordingly, since the front contact member is integrally provided with the front orthogonal plate portion and the front nut (even in a separate state from the screw rod), the installation operation of the front contact member (the front nut) to the screw rod is easier than that in the case where the front orthogonal plate portion of the front contact member and the nut member are provided as separate elements.

In addition, there is no possibility of the front orthogonal plate portion and the front nut separating from each other when a large load caused by a vehicle collision, etc., is applied to the screw rod, which improves the resistance to collision.

It is desirable for the collision load receiving portion to be spaced upward from the base surface of the lower rail before a portion of the screw rod, which is positioned between the front nut and the worm wheel, tilts toward the base surface of the lower rail, and for the collision load receiving portion to come into contact with the base surface of the lower rail when the portion of the screw rod tilts toward the base surface of the lower rail.

If the power slide device is structured such that the fixed plate portion of the rear support member and the collision load receiving portion of the front contact member are in contact with the base surface of the lower rail, it is difficult to fix the rear support member to the bottom of the lower rail so that the screw rod becomes parallel to the lower rail.

However, according to above-described structure, out of the collision load receiving portion and the rear support member, only the rear support member is made to contact the bottom of the lower rail, which makes it easy to fix the rear support member to the bottom of the lower rail so that the screw rod becomes parallel to the lower rail.

It is desirable for a linear distance in a vertical direction from an axis of the screw rod to the base surface of the lower rail to be shorter than a linear distance from the axis of the screw rod to a side edge of an undersurface of the collision load receiving portion.

Accordingly, if the front contact member slightly rotates relative to the screw rod, a lower surface of the collision load receiving portion comes into contact with the bottom of the lower rail, and the front contact member can be prevented from rotating greatly relative to the screw rod. Consequently, the screw-engagement between the front nut and the screw rod is not easily loosened, which stabilizes the state of the support of the screw rod by the rear support member.

In an embodiment, a power slide device for a vehicle seat is provided, including a lower rail which is immovable with respect to a vehicle floor and extends in a forward/rearward direction; an upper rail which supports a seat, the upper rail being slidable relative to the lower rail in a lengthwise direction of the lower rail; a rear support member fixed to the upper rail; a screw rod which extends in the forward/rearward direction, wherein a rear portion of the screw rod is supported by the rear support member; a front support member provided with a front orthogonal plate portion and a fixed plate portion, wherein the front orthogonal plate portion lies in a plane orthogonal to a straight line extending in the lengthwise direction of the lower rail, wherein a front through-hole, into which a front portion of the screw rod is inserted, is formed in the front orthogonal plate portion, and wherein the fixed plate portion extends forward from an upper end of the front orthogonal plate portion and is fixed to an undersurface of a roof surface of the upper rail; a movement limiter which limits movement of the screw rod relative to the front support member; a worm wheel provided with a female screw hole, in which the screw rod is screw-engaged so as to extend and pass through the worm wheel, wherein the worm wheel is immovable relative to the lower rail in the forward/rearward direction, and wherein a rotation of the worm wheel by power of a driver causes the screw rod to move in the forward/rearward direction relative to the lower rail; and a collision load receiving portion which limits rearward tilting of the front orthogonal plate portion by contacting the undersurface of the roof surface of the upper rail upon a force being exerted on the screw rod forwardly from the upper rail. The collision load receiving portion is positioned behind the front orthogonal plate portion in the forward/rearward direction, and is spaced upward from the screw rod and integrated with the front support member that is mounted to the screw rod.

Accordingly, if a large forward inertia force, which is caused by a collision of a vehicle equipped with the power slide device, acts on the upper rail, the front orthogonal plate portion of the front support member attempts to tilt rearward by a large amount, relative to the fixed plate portion (the connecting portion between the fixed plate portion and the front orthogonal plate portion attempts to be plastically deformed).

However, according to the above-described structure, upon the front orthogonal plate portion slightly tilting rearward (upon the connecting portion between the fixed plate portion and the front orthogonal plate portion being slightly deformed), the inertia force acting on the upper rail is received by the front support member and the collision load receiving portion.

Accordingly, except when the inertia force acting on the upper rail is extremely large, there is no possibility of the screw rod being deformed (plastically deformed) by an occurrence of plastic deformation of the front support member. Consequently, the power slide device can be smoothly actuated even after the collision.

It is desirable for the power slide device to include a rear contact member which includes a rear orthogonal plate portion which lies in a plane orthogonal to the straight line and the collision load receiving portion, wherein the rear orthogonal plate portion is positioned behind the front orthogonal plate portion and is provided with a rear through-hole, via which the screw rod extends through the rear orthogonal plate portion. The movement limiter includes a front nut, a rear surface of which is in contact with a front surface of the front orthogonal plate portion, the front nut being screw-engaged with the screw rod at a position in front of the front orthogonal plate portion; and a rear nut which is screw-engaged with the screw rod at a position behind the front orthogonal plate portion, the rear nut holding the rear contact member in a state where the rear contact member is in contact with a rear surface of the front orthogonal plate portion.

Accordingly, upon the front orthogonal plate portion slightly tilting rearward (upon the connecting portion between the fixed plate portion and the front orthogonal plate portion being slightly deformed), the inertia force acting on the upper rail is received by two members: the front support member and the rear contact member. Accordingly, the front support member can be more securely prevented from tilting by a large amount to a degree such as to become plastically deformed.

It is desirable for a rotation stop recess and a rotation stop projection to be formed on one and the other of opposed surfaces of the front orthogonal plate portion and the rear orthogonal plate portion, respectively, wherein engagement between the rotation stop projection and the rotation stop recess prevents the front orthogonal portion and the rear orthogonal portion from rotating relative to each other.

Accordingly, the front orthogonal plate portion (the front contact member) and the rear orthogonal plate portion (the rear support member) are prevented from rotating relative to each other, so that the screw-engagement between the front nut, the rear nut and the screw rod is not easily loosened, which stabilizes the state of the support of the screw rod by the rear support member.

The present disclosure relates to subject matter contained in Japanese Patent Application No. 2012-99591 (filed on Apr. 25, 2012) which is expressly incorporated herein by reference in its entirety.

BRIEF DESCRIPTION OF THE DRAWINGS

The present invention will be discussed below in detail with reference to the accompanying drawings, in which.

DESCRIPTION OF THE EMBODIMENTS

Figure 1:
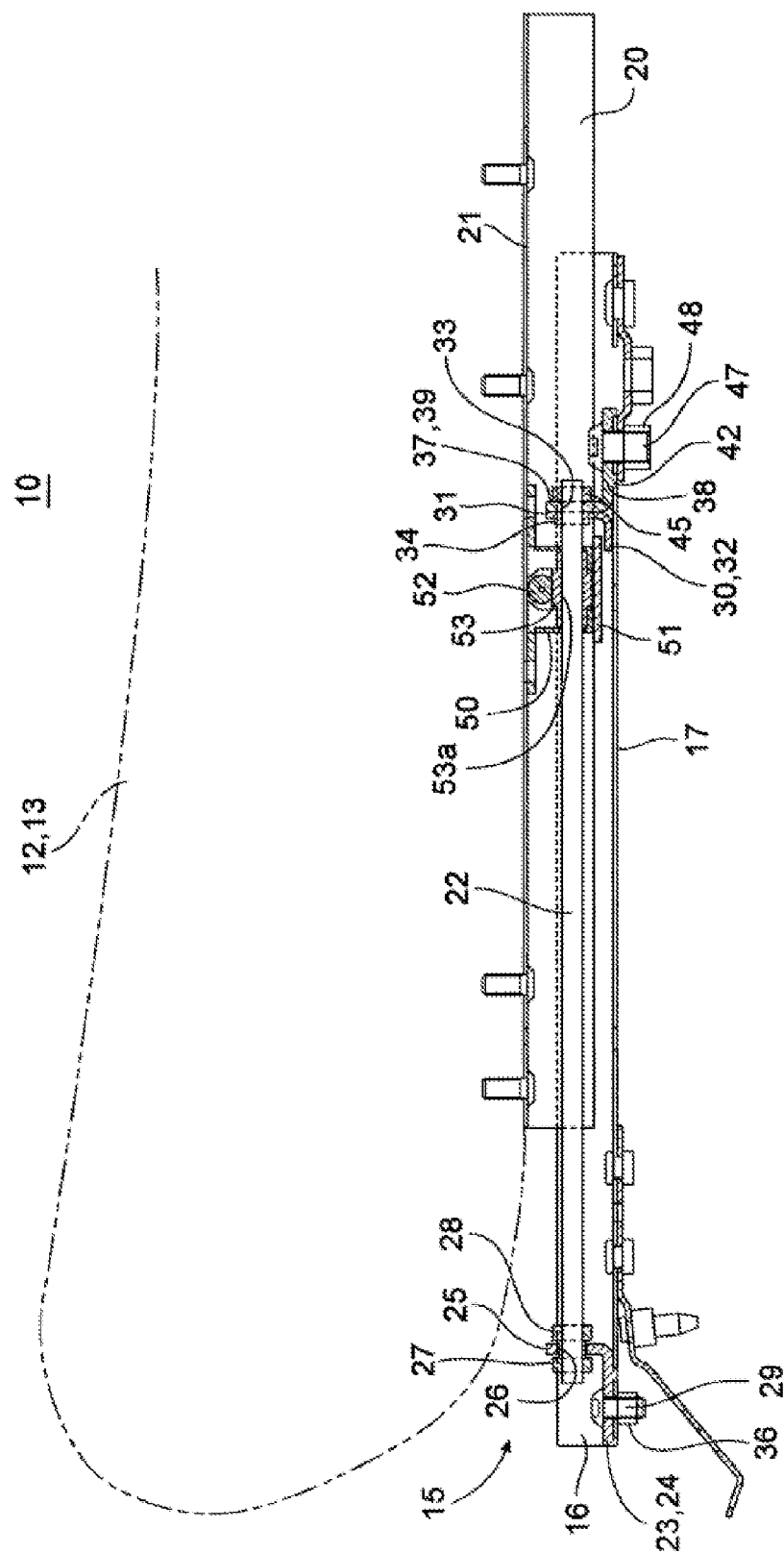
FIG. 1 is a longitudinal side sectional view of a vehicle seat device to which an embodiment of a power slide device for a vehicle seat according to the present invention is applied.
Figure 2:
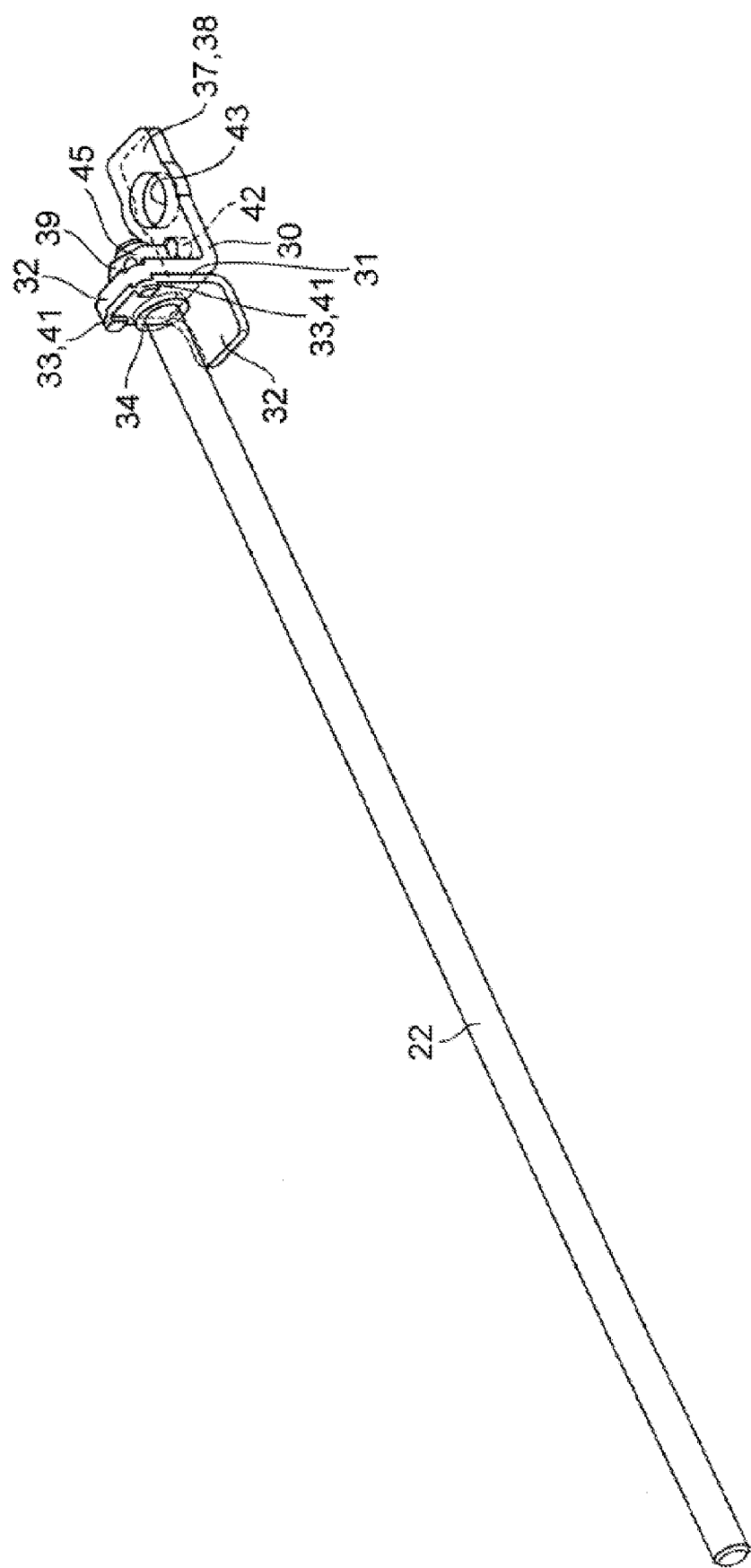
FIG. 2 is a perspective view of a screw rod, a front contact member, a rear support member and a rear nut in an installed state which constitute elements of the vehicle seat device shown in FIG. 1.
Figure 3:
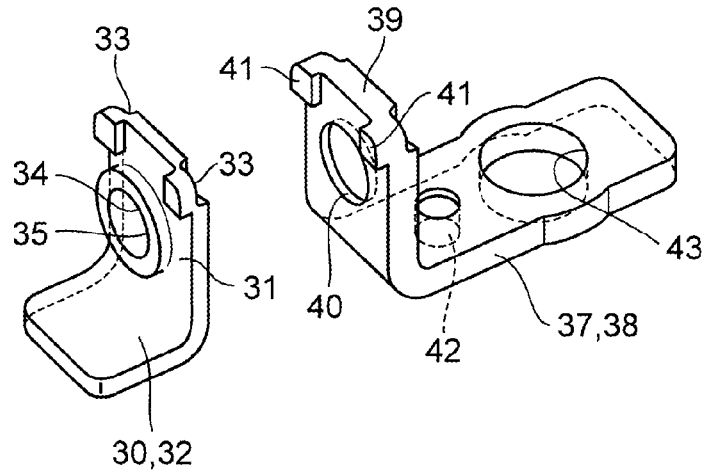
FIG. 3 is a perspective view of the front contact member and the rear support member in a mutually separated state.

Directions described in the following description are defined based on the directions of arrows shown in the drawings.

The vehicle seat device 10 that is shown FIG. 1 is provided with a seat 12 and a power slide device 15 which is fixed to a vehicle floor panel and supports a seat cushion 13 of the seat 12.

The power slide device 15 is provided with a left and right pair of lower rails 16 which are fixed to a vehicle floor panel via a front and rear pair of brackets (not shown) and extend in the forward/rearward direction, and the power slide device 15 is further provided with a left and right pair of upper rails 20 which are mounted to the pair of lower rails 16 to be slidable thereon, respectively. Each lower rail 16 is a channel member made of metal, the upper side of which is open. Each lower rail 16 is provided at the bottom thereof with a base plate portion 17, having the shape of a horizontal plate which is fixed to a vehicle floor panel. Each upper rail 20 is a channel member made of metal, the bottom side of which is open. Each upper rail 20 is provided at the top thereof with a roof plate portion 21 having the shape of a horizontal plate to which the seat cushion 13 is fixed.

A metal screw rod 22 is formed as a columnar member extending in the forward/rearward direction, has a male screw thread formed over the entire peripheral surface of the screw rod 22, and is fixed to the base plate portion 17 of the lower rail 16 via a front support member 23, a front first nut 27, a front second nut 28, a front contact member 30, a rear support member 37 and a rear nut (movement limiter) 45.

The front support member 23 is made of metal and is L-shaped in a side view. The front support member 23 is integrally provided with a fixed plate portion 24 and a support plate portion 25. The fixed plate portion 24 is in the shape of a horizontal plate and fixed to the base plate portion (base surface) 17, and the support plate portion 25 extends upward from the rear end of the fixed plate portion 24 and lies in a plane orthogonal to a straight line extending in the forward/rearward direction. A through-hole 26 is formed through the support plate portion 25 in the forward/rearward direction.

A portion of the screw rod 22 in the vicinity of the front end thereof is inserted into the through-hole 26 of the support plate portion 25 so that the front end of the screw rod 22 projects forward from the through-hole 26, and the front first nut 27 and the front second nut 28 that are respectively positioned in front of and behind the support plate portion 25 are screwed onto a portion of the screw rod 22 in the vicinity of the front end thereof.

The front contact member 30 is made of metal and is L-shaped in a side view. The front contact member 30 is integrally provided with a screw mounting portion (front orthogonal plate portion) 31 and a collision load receiving portion 32. The screw mounting portion 31 is in the shape of a plate and lies in a plane orthogonal to a straight line extending in the forward/rearward direction, and the collision load receiving portion 32 is in the shape of a horizontal plate and extends forward from the lower end of the screw mounting portion 31. A left and right pair of rotation stop grooves 33 are formed at the upper opposite corners of the rear surface of the screw mounting portion 31 to be recessed forward, respectively. In addition, a circular nut portion (front nut) 34 is formed integral with the front of the screw mounting portion 31 of the front contact member 30 to project forwardly (the front contact member 30 and the nut portion 34 remain integral with each other even when the front contact member 30 is disengaged from the screw rod 22), and a female screw hole (front through-hole) 35 is formed through the screw mounting portion 31 and the nut portion 34 to extend therethrough in the forward/rearward direction. The front contact member 30 is fixed to a portion of the screw rod 22 in the vicinity of the rear end thereof by making the male screw thread of the screw rod 22 engaged with the female screw hole 35.

The rear support member 37 is made of metal and is L-shaped in a side view. The rear support member 37 is integrally provided with a fixed plate portion 38 and a rear orthogonal plate portion 39. The fixed plate portion 38 is in the shape of a horizontal plate and fixed to the base plate portion (base surface) 17, and the rear orthogonal plate portion 39 extends upward from the front end of the fixed plate portion 38 and lies in a plane orthogonal to a straight line extending in the forward/rearward direction. The rear orthogonal plate portion 39 is provided with a rear through-hole 40 which extends through the rear orthogonal plate portion 39 in the forward/rearward direction, and is further provided, at the upper opposite corners of the front surface of the rear orthogonal plate portion 39, with a left and right pair of rotation stop projections 41 which project forwardly, respectively. On the other hand, the fixed plate portion 38 is provided with an engaging projection 42 which projects downward, and a bolt insertion hole 43 formed at a position behind the engaging projection 42. The rear support member 37 is fixed to a portion of the screw rod 22 in the vicinity of the rear end thereof to be positioned immediately behind the front contact member 30 by inserting the screw rod 22 into the rear through-hole 40, making the opposed surfaces of the screw mounting portion 31 and the rear orthogonal plate portion 39 contact each other, and engaging the left and right pair of rotation stop projections 41 into the left and right pair of rotation stop grooves 33.

A rear nut 45 which is screwed onto the rear end of the screw rod 22 to be positioned immediately behind the rear orthogonal plate portion 39.

An integrated component configured of the screw rod 22, the front support member 23, the front first nut 27, the front second nut 28, the front contact member 30, the rear support member 37, the rear nut 45 and a gear box 50 (which will be discussed later; see FIG. 1), which are mutually assembled, is fixed to the lower rail 16 by screwing a bolt 47 which extends through the fixed plate portion 38, the bottom portion 17 and a vehicle floor panel from above down into a weld nut 48 fixed to the undersurface of the vehicle floor panel after mounting the lower surfaces of the fixed plate portion 24 of the front support member 23 and the lower surfaces of the fixed plate portion 38 of the rear support member 37 onto the upper surface of the base plate portion 17, screwing a bolt 29 which extends through the fixed plate portion 24, the base plate portion 17 and the vehicle floor panel from above down into a weld nut 36 fixed to the undersurface of the vehicle floor panel, and engaging the engaging projection 42 into an engaging hole formed in the base plate portion 17.

Fixing the above-mentioned integrated component to the lower rail 16 in the above described manner causes the collision load receiving portion 32 to be spaced slightly upward from the upper surface of the base plate portion 17 (so as to define a gap (space) between the base plate portion 17 and the collision load receiving portion 32). In addition, the linear distance in the vertical direction from the axis of the screw rod 22 to the upper surface of the base plate portion 17 is shorter than the linear distance from the axis of the screw rod 22 to each of the left and right side edges of the undersurface of the collision load receiving portion 32.

After the front support member 23 and the rear support member 37 are fixed to a vehicle floor panel, the front first nut 27 and the front second nut 28 are rotated relative to the screw rod 22 to sandwich and hold the support plate portion 25 between the front first nut 27 and the front second nut 28 from the front and rear sides of the support plate portion 25, respectively. Additionally, the contact state between the opposed surfaces of the screw mounting portion 31 and the rear orthogonal plate portion 39 is maintained by making the front surface of the rear nut 45 and the rear surface of the rear orthogonal plate portion 39 contact each other by rotating the rear nut 45 relative to the screw rod 22.

Due to the above-described assembly procedure, the screw rod 22 can be supported by the lower rail 16 so as not to be slidable relative to the base plate portion 17 in the forward/rearward direction and so as not to be rotatable about the central axis of the screw rod 22.

The power slide device 15 is provided with the gear box 50 that is installed between the front second nut 28 and the front contact member 30. The gear box 50 is installed to the screw rod 22 before either a set of components including the front support member 23, the front first nut 27 and the front second nut 28 or a set of components including the front contact member 30, the rear support member 37 and the rear nut 45 is installed to the screw rod 22.

The gear box 50 is provided with a case 51, a worm 52 and a worm wheel 53. The case 51 is provided in the front and rear walls thereof with a front through-hole and a rear through-hole, respectively, which are aligned in the forward/rearward direction. The worm 52 is positioned and supported in the case 51 to be rotatable on an axis extending in the leftward/rightward direction, and the worm wheel 53 is positioned and supported in the case 51 to be rotatable on an axis extending in the forward/rearward direction and to be engaged with the worm 52. The worm wheel 53 is provided with a female screw hole 53a, which serves as a through-hole which is formed coaxial with the aforementioned front and rear through-holes of the case 51.

The gear box 50 is mounted to the screw rod 22 by making a middle portion of the screw rod 22 extend through the front and rear walls of the case 51 and the female screw hole 53a of the worm wheel 53, and screw-engaging the male screw thread of the screw rod 22 with the female screw hole 53a of the worm wheel 53.

The gear box 50 that has the above described structure is fixed to the upper rail 20 by fixing the case 51 to the undersurface of the roof plate portion 21 of the upper rail 20 using a bolt and a nut.

A motor (driver) M is fixed to a bracket (not shown) integrated with the seat cushion 13, and an end of a flexible shaft (not shown) which rotates with the rotary shaft of the motor M is fixed to a central part of the worm 52.

Therefore, rotating the motor M forward by manually operating a switch (not shown) provided on the seat 12 causes the worm 52 and the worm wheel 53 to rotate forward, thus causing the gear box 50 and the upper rail 20 to slidingly move forward relative to the screw rod 22 and the lower rail 16. On the other hand, rotating the motor M reverse by manually operating the aforementioned switch causes the worm 52 and the worm wheel 53 to rotate in reverse, thus causing the gear box 50 and the upper rail 20 to slidingly move rearward relative to the screw rod 22 and the lower rail 16.

Figure 4:
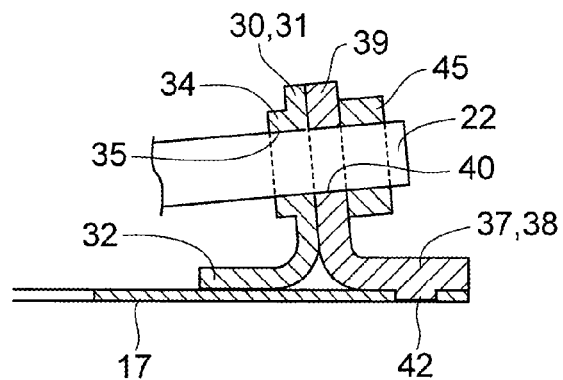
FIG. 4 is an enlarged longitudinal side sectional view of the rear of the screw rod, the front contact member, the rear support member and the rear nut when a vehicle equipped with the power slide device collides with another vehicle ahead.

If a vehicle equipped with the vehicle seat device 10 that has the above described structure collides with another vehicle ahead from behind this other vehicle, sometimes a large forward inertia force which is caused by this collision acts on the seat 12 and upper rail 20 (sometimes a movement force acts in a forward direction from the upper rail 20 against the screw rod 22). Thereupon, the rear orthogonal plate portion 39 of the rear support member 37 attempts to tilt forward by a large amount, relative to the fixed plate portion 38 (the connecting portion between the fixed plate portion 38 and the rear orthogonal plate portion 39 attempts to be plastically deformed); however, as shown in FIG. 4, upon the rear orthogonal plate portion 39 slightly tilting forward (upon the connecting portion between the fixed plate portion 38 and the rear orthogonal plate portion 39 being slightly elastically deformed), the collision load receiving portion 32 of the front contact member 30 comes into contact with an upper surface of the base plate portion 17, which causes the aforementioned inertia force to be received by two members: the front contact member 30 (the collision load receiving portion 32) and the rear support member 37. Accordingly, except when the inertia force acting on the seat 12 and the upper rail 20 is extremely large, there is no possibility of the screw rod 22 being deformed (plastically deformed) by an occurrence of plastic deformation of the rear support member 37. Consequently, the vehicle seat device 10 (the power slide device 15) can be smoothly actuated even after a collision.

In addition, since the front contact member 30 and the rear support member 37 are prevented from rotating relative to each other by engagement of the pair of rotation stop grooves 33 with the pair of rotation stop projections 41, neither the screw engagement between the female screw hole 35 and the screw rod 22 nor the screw engagement between the rear nut 45 and the screw rod 22 is easily loosened, which stabilizes the state of the support of the screw rod 22 by the rear support member 37.

Since the linear distance in the vertical direction from the axis of the screw rod 22 to the upper surface of the base plate portion 17 is shorter than the linear distance from the axis of the screw rod 22 to each of the left and right side edges of the undersurface of the collision load receiving portion 32 as described above, even in the case of not providing the front contact member 30 and the rear support member 37 with the pair of rotation stop grooves 33 and the pair of rotation stop projections 41, respectively, a lower surface of the collision load receiving portion 32 comes into contact with the base plate portion 17 if the front contact member 30 slightly rotates relative to the screw rod 22 by vibrations or the like which are transmitted from the gear box 50 to the screw rod 22, so that similar effects can be obtained in this case also.

Additionally, if the power slide device 15 were to be configured such that both the fixed plate portion 38 of the rear support member 37 and the collision load receiving portion 32 of the front contact member 30 are always in contact with the base plate portion 17 of the lower rail 16, it would be difficult to fix the rear support member 37 to the base plate portion 17 so that the screw rod 22 becomes parallel to the lower rail 16. However, in the present embodiment of the vehicle seat device 10, only the rear support member 37 (the fixed plate portion 38) is made to contact the base plate portion 17 while the front contact member 30 (the collision load receiving portion 32) is made not to contact the base plate portion 17 (namely, a gap (space) is defined between the underside of the collision load receiving portion 32 and the upper surface on the base plate portion 17), which makes it easy to fix the rear support member 37 to the base plate portion 17 so that the screw rod 22 is parallel to the lower rail 16.

Additionally, since the front contact member 30 is integrally provided with the nut portion 34 (the female screw hole 35), the installation operation of the front contact member 30 (the nut portion 34) to the screw rod 22 is easier than that in the case where the front contact member 30 and the nut portion 34 (the female screw hole 35) are provided as separate elements.

Additionally, since the front contact member 30 is integrally provided with the nut portion 34 (the female screw hole 35), there is no possibility of the screw mounting portion 31 and the nut portion 34 (the female screw hole 35) separating from each other when a large load caused by a vehicle collision, etc., is applied to the front contact member 30, which improves the resistance to collision.

Although the present invention has been described based on the above illustrated embodiment, the present invention is not limited solely to this particular embodiment; various modifications to the above illustrated embodiment is possible.

Figure 5:
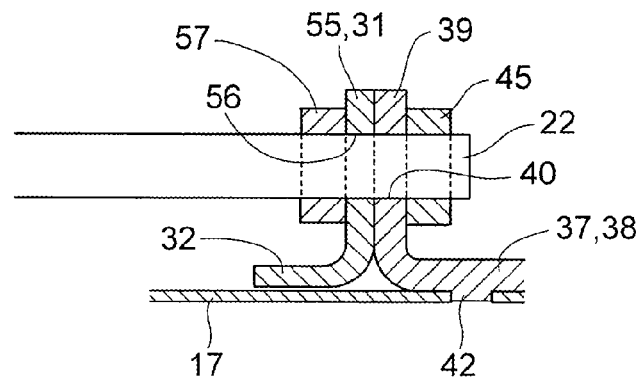
FIG. 5 is an enlarged longitudinal side sectional view of the rear of the screw rod, a front nut, the front contact member, the rear support member and the rear nut in a modified embodiment of the power slide device.

For instance, as shown in FIG. 5, the front contact member 30, which is integrally provided with the nut portion 34, can be replaced by a front contact member 55 that is provided as a separate member from a nut (front nut) 57, which corresponds to the nut portion 34.

A through-hole (front through-hole) 56, into which the screw rod 22 can be slidably inserted, is formed in the screw mounting portion 31 of the front contact member 55, and the screw mounting portion 31 of the front contact member 55 is provided on the rear side thereof with a pair of rotation stop grooves 33 (not shown in FIG. 5).

The front contact member 55 of this modified embodiment becomes integral with the screw rod 22 and the rear support member 37 (i.e., the front contact member 55 is immovable relative to the screw rod 22 and the rear support member 37) by making the rear surface of the nut 57 that is screw-engaged with the screw rod 22 in front of the front contact member 55 press against the front surface of the screw mounting portion 31.

Also in this case using the front contact member 55 and the nut 57, advantageous effects substantially the same as those obtained in the above described embodiment can be realized.

Figure 6:
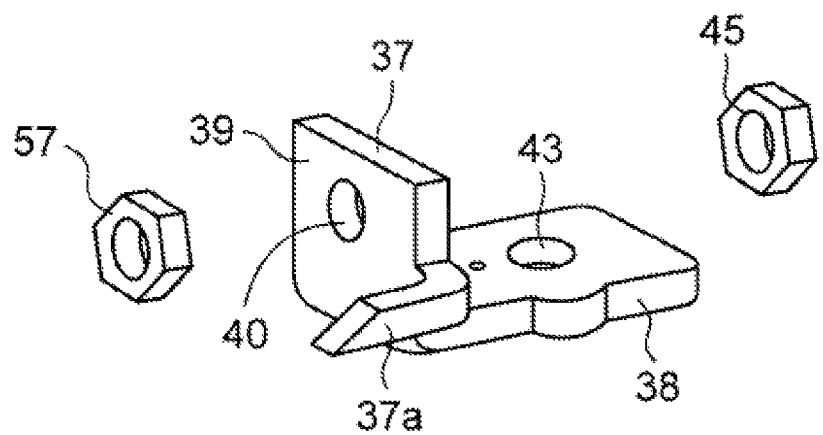
FIG. 6 is an exploded perspective view of the rear support member, the front nut and the rear nut in another modified embodiment of the power slide device.

Additionally, as shown in FIG. 6 of another modified embodiment, by omitting the front contact member 30 from the power slide device 15, a collision load receiving portion 37a can be integrally formed with the rear orthogonal plate portion 39 (not provided with the pair of rotation stop projections 41) of the rear support member 37 to project forwardly from one of the laterally opposite side edges of the rear orthogonal plate portion 39 (in this modified embodiment, the collision load receiving portion 37a remains integrated with the rear support member 37 even when the rear support member 37 is separated from the screw rod 22). In this case, the rear surface of the nut 57 contacts the front surface of the rear orthogonal plate portion 39 from the front side. In addition, the lower end of the collision load receiving portion 37a is positioned below the lower surface of the nut 57 in the vertical direction.

Advantageous effects substantially the same as those obtained in the above described embodiment can be expected also in the case where the power slide device 15 is modified as shown in FIG. 6.

In the modified embodiment shown in FIG. 6, the rear orthogonal plate portion 39 can be integrally provided with two collision load receiving portions (each of which corresponds to the collision load receiving portion 37a) which project forwardly from the lateral opposite side edges of the rear orthogonal plate portion 39 of the rear support member 37, respectively. Additionally, in the modified embodiment shown in FIG. 6, the nut 57 can be replaced by the nut portion 34 which is formed integral with the front surface of the orthogonal plate portion 39 so that the female screw hole 35 is formed through the rear orthogonal plate portion 39 and the nut portion 34 to extend therethrough in the forward/rearward direction.

Figure 7:
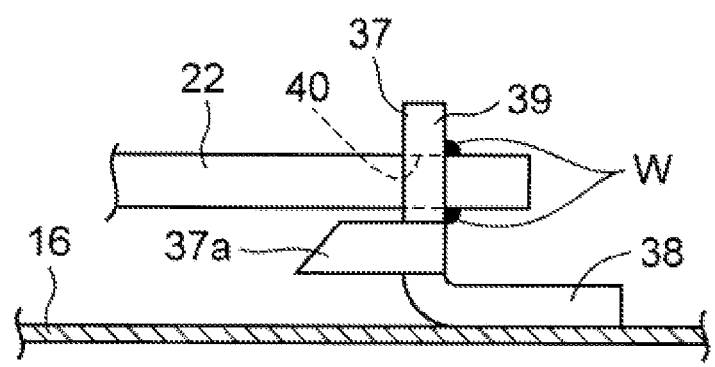
FIG. 7 is a side elevational view of the rear support portion and the screw rod in yet another embodiment of the power slide device.

Another embodiment (modified embodiment) shown in FIG. 7 is also possible. In this modified embodiment, the rear nut 45 and the nut 57 (the nut portion 34) are omitted; instead, the rear orthogonal plate portion 39 and the screw rod 22 are fixed to each other by a weld W which spreads between a rear surface of the rear orthogonal plate portion 39 and the screw rod 22 (to prevent the rear orthogonal plate portion 39 and the screw rod 22 from moving relative to each other).

The weld W can be made to extend between a front surface of the rear orthogonal plate portion 39 and the screw rod 22.

Additionally, the technical idea of using the weld W can also be applied to the embodiment shown in FIGS. 1 through 4, the modified embodiment shown in FIG. 5 and a modified embodiment shown in FIG. 8 which will be discussed hereinafter.

Figure 8:
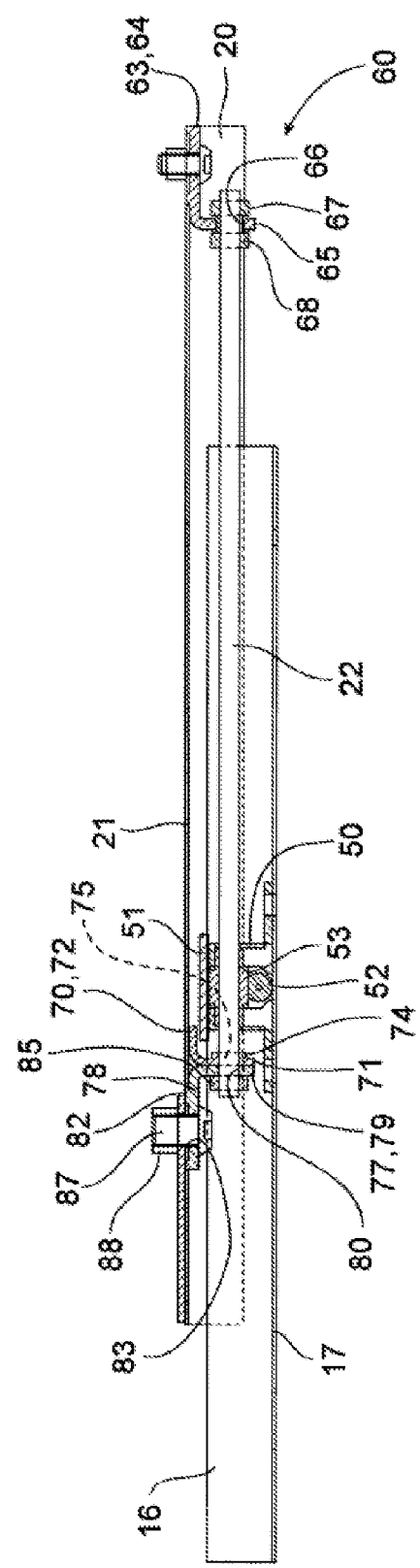
FIG. 8 is a longitudinal side sectional view of a vehicle seat device to which yet another modified embodiment of the power slide device for a vehicle seat according to the present invention is applied.
Figure 9:
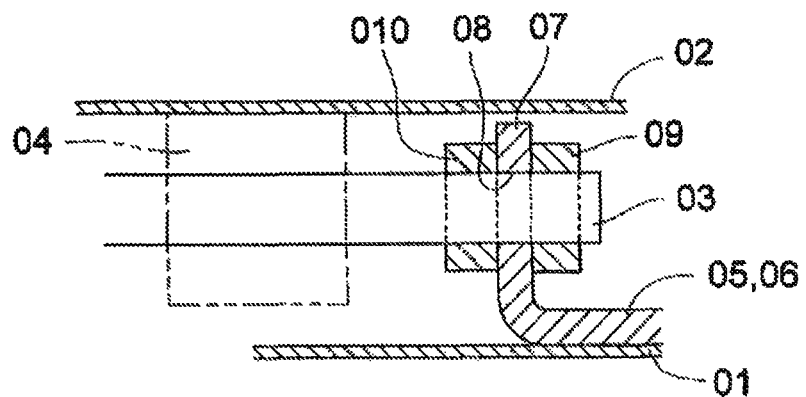
FIG. 9 is an enlarged longitudinal side sectional view of the rear of a lower rail, the rear of an upper rail, the rear of a screw rod, a rear support member, a front nut and a rear nut of a power slide device of the related art.

As shown in FIG. 8, the gear box 50 can be fixed to the lower rail 16, while a rear support member 63, a rear contact member 70 and a front support member 77 which correspond to the front support member 23, the front contact member 30 and the rear support member 37, respectively, can be fixed to the upper rail 20.

The rear support member 63 is made of metal and is L-shaped in a side view. The rear support member 63 has a shape such that the rear support member 63 and the front support member 23, of the other embodiments, are rotationally symmetrical in a side view. The rear support member 63 is integrally provided with a fixed plate portion 64 and a support plate portion 65. The fixed plate portion 64 is in the shape of a horizontal plate and fixed to the undersurface (roof surface) of the roof plate portion 21, and the support plate portion 65 extends downward from the front end of the fixed plate portion 64 and lies in a plane orthogonal to a straight line extending in the forward/rearward direction. A through-hole 66 is formed through the support plate portion 65 to extend in the forward/rearward direction. A portion of the screw rod 22 (which is screw-engaged with the female screw hole 53a of the worm wheel 53) in the vicinity of the rear end thereof is inserted into the through-hole 66 of the support plate portion 65 so that the rear end of the screw rod 22 projects rearwardly from the through-hole 26, and a rear first nut 67 and a rear second nut 68 that are respectively positioned behind and in front of the support plate portion 65 are screwed onto a portion of the screw rod 22 in the vicinity of the rear end thereof to sandwich and hold the support plate portion 65 between the rear first nut 67 and the rear second nut 68 from the front and rear sides of the support plate portion 65, respectively.

The rear contact member 70 is made of metal and is L-shaped in a side view. The rear contact member 70 has a shape such that the rear contact member 70 and the front contact member 30, of the other embodiments, are rotationally symmetrical in a side view. The rear contact member 70 is integrally provided with a screw mounting portion (rear orthogonal plate portion) 71 and a collision load receiving portion 72. The screw mounting portion 71 is in the shape of a plate and lies in a plane orthogonal to a straight line extending in the forward/rearward direction, and the collision load receiving portion 72 is in the shape of a horizontal plate and extends rearward from the upper end of the screw mounting portion 71. A left and right pair of rotation stop grooves 33 (not shown in FIG. 8) are formed at the lower opposite corners of the front surface of the screw mounting portion 71 and are recessed rearwardly, respectively. In addition, the screw mounting portion 71 is integrally provided on the rear side thereof with a circular nut portion (rear nut) 74 which projects rearwardly, and a female screw hole (rear through-hole) 75 is formed through the screw mounting portion 71 and the nut portion 74 to extend therethrough in the forward/rearward direction. The rear contact member 70 is fixed to a portion of the screw rod 22 in the vicinity of the front end thereof by engaging the male screw thread of the screw rod 22 with the female screw hole 75.

The front support member 77 is made of metal and is L-shaped in a side view. The front support member 77 has a shape such that the front support member 77 and the rear support member 37, of the other embodiments, are rotationally symmetrical in a side view. The front support member 77 is integrally provided with a fixed plate portion 78 and a front orthogonal plate portion 79. The fixed plate portion 78 is in the shape of a horizontal plate and fixed to the undersurface of the roof plate portion 21, and the front orthogonal plate portion 79 extends downward from the rear end of the fixed plate portion 78 and lies in a plane orthogonal to a straight line extending in the forward/rearward direction. The front orthogonal plate portion 79 is provided with a front through-hole 80 which extends through the front orthogonal plate portion 79 in the forward/rearward direction, and is further provided, at the lower opposite corners of the rear surface of the front orthogonal plate portion 79, with a left and right pair of rotation stop projections 41 (not shown in FIG. 8) which project rearwardly to correspond to the aforementioned pair of rotation stop grooves 33 (not shown in FIG. 8), respectively. On the other hand, the fixed plate portion 78 is provided with an engaging projection 82 which projects upward, and a bolt insertion hole 83 formed at a position in front of the engaging projection 82. The front support member 77 is fixed to a portion of the screw rod 22, in the vicinity of the front end thereof, to be positioned immediately in front of the rear contact member 70 by inserting the screw rod 22 into the front through-hole 80, making the opposed surfaces of the screw mounting portion 71 and the front orthogonal plate portion 79 contact each other and also engaging the left and right pair of rotation stop projections 41 in the left and right pair of rotation stop grooves 33. The power slide device 15 shown in FIG. 8 is provided with a front nut (movement limiter) 85 which is screwed onto a portion of the screw rod 22 in the vicinity of the front end thereof to be positioned immediately in front of the front orthogonal plate portion 79. The contact state between the opposed surfaces of the screw mounting portion 71 and the front orthogonal plate portion 79 is maintained by making the rear surface of the front nut 85 and the front surface of the front orthogonal plate portion 79 contact each other by rotating the front nut (movement limiter) 85 which is positioned in front of the front orthogonal plate portion 79 relative to the screw rod 22.

The front support member 77 is fixed to the roof plate portion 21 by screwing a bolt 87 which has been inserted into the bolt insertion hole 83 from below into a weld nut 88 fixed to an upper surface of the roof plate portion 21. Fixing the front support member 77 to the upper rail 20 in this manner causes the collision load receiving portion 72 to be spaced slightly downward from the lower surface of the roof plate portion 21 (so as to define a gap (space) between the roof plate portion 21 and the collision load receiving portion 72). In addition, the linear distance in the vertical direction from the axis of the screw rod 22 to the lower surface of the roof plate portion 21 is shorter than the linear distance from the axis of the screw rod 22 to each of the left and right side edges of the upper surface of the collision load receiving portion 72.

In this modified embodiment shown in FIG. 8, if the upper rail 20 slides forward relative to the lower rail 16 by a collision of a vehicle equipped with the vehicle seat device 10 with another vehicle ahead (from behind this other vehicle) (if a movement force acts in a forward direction from the upper rail 20 against the screw rod 22) the front orthogonal plate portion 79 of the front support member 77 to attempt to tilt rearward greatly relative to the fixed plate portion 78 (the connecting portion between the fixed plate portion 78 and the front orthogonal plate portion 79 attempts to plastically deform); however, upon the front orthogonal plate portion 79 slightly tilting rearward (upon the connecting portion between the fixed plate portion 78 and the front orthogonal plate portion 79 being slightly elastically deformed), the collision load receiving portion 72 of the rear contact member 70 comes into contact with the undersurface of the roof plate portion 21. Accordingly, similar to the above described embodiment shown in FIG. 1, there is no possibility of the screw rod 22 being deformed (elastically deformed) by an occurrence of plastic deformation of the front support member 77. Consequently, the vehicle seat device 10 (the power slide device 15) can be smoothly actuated even after a collision.

Similar to the modified embodiment shown in FIG. 5, the rear contact member 70 can be composed of a nut which corresponds to the nut 74 and a rear contact member which is formed as a separate member from this nut. In addition, with the omission of the rear contact member 70, a collision load receiving portion corresponding to the collision load receiving portion 37a shown in FIGS. 6 and 7 can be integrally formed with the front orthogonal plate portion 79 of the front support member 77 to project rearwardly from one of the lateral opposite side edges of the front orthogonal plate portion 79 of the front support member 77 (or two collision load receiving portions each corresponding to the collision load receiving portion 37a shown in FIGS. 6 and 7 can be integrally formed with the front orthogonal plate portion 79 of the front support member 77 to project rearwardly from the lateral opposite side edges of the front orthogonal plate portion 79 of the front support member 77, respectively) (in this modified embodiment, the collision load receiving portion(s) remains integrated with the front orthogonal plate portion 79 even when the front support member 77 is separated from the screw rod 22).

The collision load receiving portions 32, 37a and 72 can each be made to contact the upper surface of the base plate portion 17 or the lower surface of the roof plate portion 21 from the beginning (before a collision); in addition, the collision load receiving portions 32, 37a and 72 can be fixed to the base plate portion 17 or the roof plate portion 21 by a bolt(s), etc., after being made to contact the upper surface of the base plate portion 17 or the lower surface of the roof plate portion 21. This also makes it possible to prevent the screw rod 22 from being deformed (plastically deformed) by an occurrence of plastic deformation of the rear support member 37 or the front support member 77.

A pair of rotation stop projections (corresponding to the pair of rotation stop projections 41) which project rearward can be formed on the rear surface of the front contact member 30 (the screw mounting portion 31) while a pair of rotation stop recesses (corresponding to the pair of rotation stop recesses 33) which are recessed rearward can be formed on the front surface of the rear support member 37 (the rear orthogonal plate portion 39). Likewise, a pair of rotation stop projections (corresponding to the pair of rotation stop projections 41) which project forwardly can be formed on the front surface of the rear contact member 70 (the screw mounting portion 71) while a pair of rotation stop recesses (corresponding to the pair of rotation stop recesses 33) which are recessed forward can be formed on the rear surface of the front support member 77 (the front orthogonal plate portion 79).

The number of the rotation stop projections and the corresponding number of the rotation stop recesses can each be more than two. In addition, in the case where each rotation stop projection and the corresponding rotation stop recess are each noncircular in shape in a front view like in the case of the above described embodiment shown in FIGS. 2 and 3, each rotation stop projection and the corresponding rotation stop recess can each be one in number.

Additionally, at least one rotation stop projection and corresponding at least one rotation stop groove can be formed on the front contact member 30 (the screw mounting portion 31) and the rear contact member 70 (the screw mounting portion 71), respectively, and at least one rotation stop projection and corresponding at least one rotation stop groove can be formed on the rear support member 37 (the rear orthogonal plate portion 39) and the front support member 77 (the front orthogonal plate portion 79), respectively.

Additionally, a rotation stopper (such as the pair of rotation stop recesses 33 and the pair of rotation stop projections 41) provided between the front contact member 30 and the rear support member 37 or between the rear contact member 70 and the front support member 77 can be omitted.

Obvious changes may be made in the specific embodiments of the present invention described herein, such modifications being within the spirit and scope of the invention claimed. It is indicated that all matter contained herein is illustrative and does not limit the scope of the present invention.

What is claimed is:
1. A power slide device for a vehicle seat, comprising:
a lower rail which is immovable with respect to a vehicle floor and extends in a forward/rearward direction;
an upper rail which supports a seat, said upper rail being slidable relative to said lower rail in a lengthwise direction of said lower rail;
a front support member fixed to said lower rail;
a screw rod which extends in said forward/rearward direction, wherein a front portion of said screw rod is supported by said front support member;
a rear support member provided with a rear orthogonal plate portion and a fixed plate portion, wherein said rear orthogonal plate portion lies in a plane orthogonal to a straight line extending in said lengthwise direction of said lower rail, wherein a rear through hole, into which a rear portion of said screw rod is inserted, is formed in said rear orthogonal plate portion, and wherein said fixed plate portion extends rearward from a lower end of said rear orthogonal plate portion and is fixed to a base surface of said lower rail;

a movement limiter which limits movement of said screw rod relative to said rear support member;

a worm wheel provided with a female screw hole, in which said screw rod is screw-engaged so as to extend and pass through said worm wheel, wherein said worm wheel moves with said upper rail in said forward/rearward direction relative to said lower rail by rotating by power of a driver; and a collision load receiving portion which limits forward tilting of said rear orthogonal plate portion by contacting said base surface of said lower rail when a force is exerted on said screw rod forwardly from said worm wheel, wherein said collision load receiving portion is positioned in front of said rear orthogonal plate portion in said forward/rearward direction and is spaced downward from said screw rod and integrated with said rear support member that is mounted to said screw rod.

2. The power slide device according to claim 1, further comprising a front contact member which includes a front orthogonal plate portion which lies in a plane orthogonal to said straight line and said collision load receiving portion, wherein said front orthogonal plate portion is positioned in front of said rear orthogonal plate portion and is provided with a front through-hole, via which said screw rod extends through said front orthogonal plate portion, wherein said movement limiter comprises:

a rear nut, a front surface of which is in contact with a rear surface of said rear orthogonal plate portion, said rear nut being screw-engaged with said screw rod at a position behind said rear orthogonal plate portion; and a front nut which is screw-engaged with said screw rod at a position in front of said rear orthogonal plate portion, said front nut holding said front contact member in a state where said front contact member is in contact with a front surface of said rear orthogonal plate portion.

3. The power slide device according to claim 2, wherein said front contact member comprises said front nut, wherein said front nut is coaxial with said front through-hole, and wherein said front nut is integrally formed with a front surface of said front orthogonal plate portion even in a separate state from said screw rod.

4. The power slide device according to claim 2, wherein said collision load receiving portion is spaced upward from said base surface of said lower rail before a portion of said screw rod, which is positioned between said front nut and said worm wheel, tilts toward said base surface of said lower rail, and wherein said collision load receiving portion comes into contact with said base surface of said lower rail when said portion of said screw rod tilts toward said base surface of said lower rail.

5. The power slide device according to claim 4, wherein a linear distance in a vertical direction from an axis of said screw rod to said base surface of said lower rail is shorter than a linear distance from said axis of said screw rod to a side edge of an undersurface of said collision load receiving portion.

* * * * *